US012564970B2

(12) United States Patent
Sada et al.

(10) Patent No.: US 12,564,970 B2
(45) Date of Patent: Mar. 3, 2026

(54) TRANSFER APPARATUS

(71) Applicant: DISCO CORPORATION, Tokyo (JP)

(72) Inventors: Jun Sada, Tokyo (JP); Yuuki Yasuda, Tokyo (JP); Takeshi Dejima, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 239 days.

(21) Appl. No.: 18/358,393

(22) Filed: Jul. 25, 2023

(65) Prior Publication Data

US 2024/0033942 A1 Feb. 1, 2024

(30) Foreign Application Priority Data

Jul. 29, 2022 (JP) ................................. 2022-121388

(51) Int. Cl.
B25J 15/06 (2006.01)
B25J 5/02 (2006.01)
B25J 11/00 (2006.01)
B25J 19/00 (2006.01)

(52) U.S. Cl.
CPC ............. B25J 11/0095 (2013.01); B25J 5/02 (2013.01); B25J 15/0616 (2013.01); B25J 19/00 (2013.01)

(58) Field of Classification Search
CPC .......................... B25J 15/0658; H01L 21/6838
See application file for complete search history.

(56) References Cited

U.S. PATENT DOCUMENTS

| | | | |
|---|---|---|---|
| 11,299,705 B2 * | 4/2022 | Langenfeld | ............. C12M 33/00 |
| 2012/0308356 A1 * | 12/2012 | Yokoyama | ........ H01L 21/68707 |
| | | | 414/800 |
| 2023/0182936 A1 * | 6/2023 | Steiner | ................. B25J 15/0616 |
| | | | 271/5 |

FOREIGN PATENT DOCUMENTS

| | | | |
|---|---|---|---|
| JP | 2015082569 A | | 4/2015 |
| JP | 2015217501 A | * | 12/2015 |
| JP | 2017127929 A | * | 7/2017 |
| JP | 2018060958 A | | 4/2018 |
| JP | 2020194901 A | | 12/2020 |

* cited by examiner

*Primary Examiner* — Gerald McClain

(74) *Attorney, Agent, or Firm* — Greer Burns & Crain Ltd.

(57) ABSTRACT

A transfer unit of a transfer apparatus includes a battery that is a power source of respective components, a suction mechanism that is a suction source of a transfer pad, a release mechanism that is an air source of the transfer pad, and a water supply mechanism that causes circulation of water stored in a water reservoir, which are all provided inside a housing of the transfer unit. This eliminates the need to externally supply the transfer unit with electric power, water, and air, and hence, the transfer unit does not include wires and pipes that are routed externally from the transfer unit and an accommodating member for accommodating the wires and pipes. Consequently, generation of dust due to rubbing between the accommodating member and the wires and pipes can be suppressed.

5 Claims, 4 Drawing Sheets

FIG.5
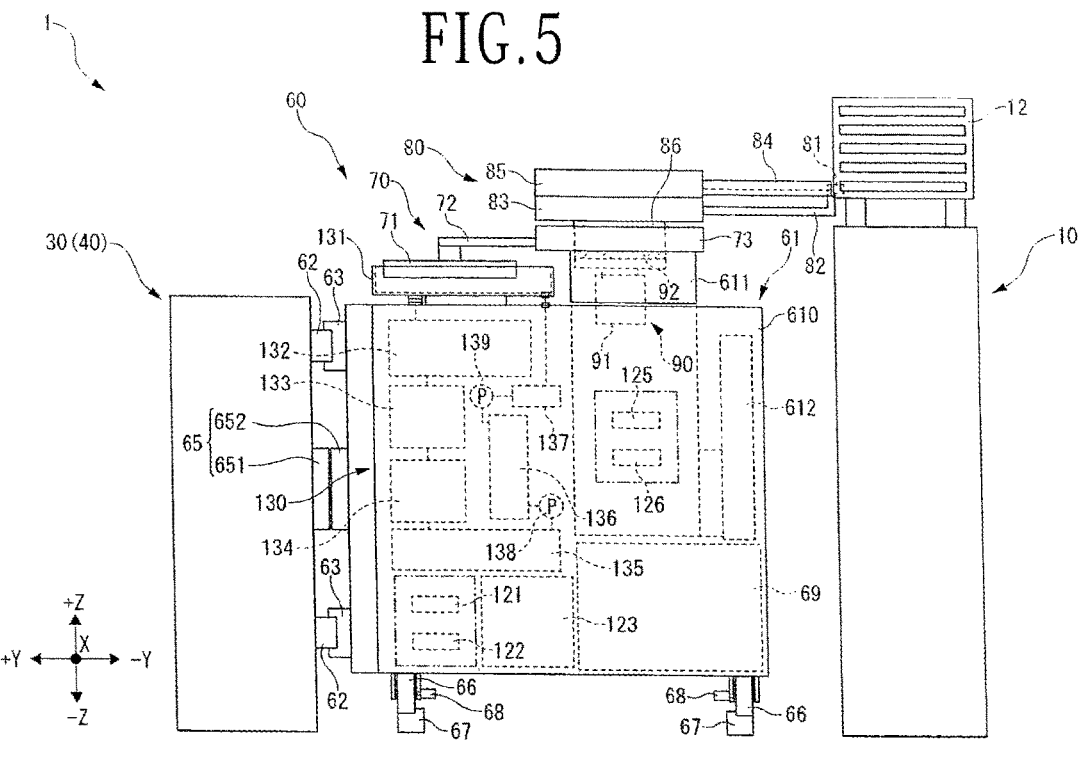
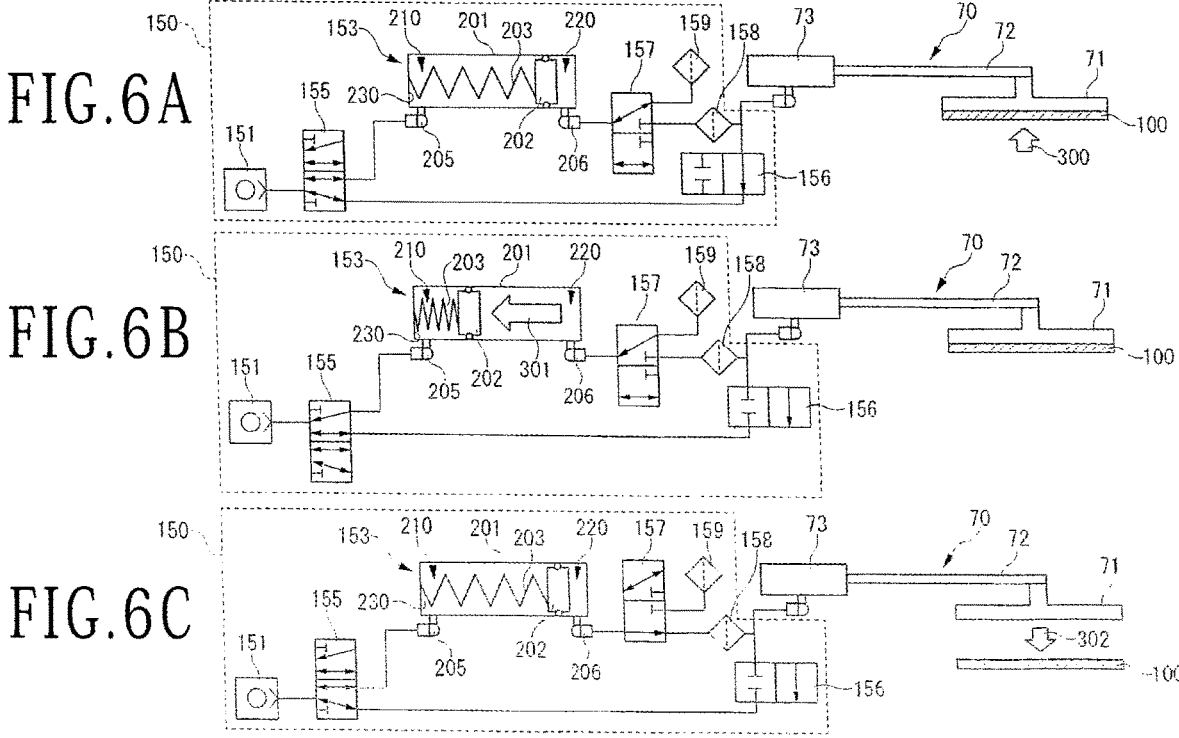
FIG.6A
FIG.6B
FIG.6C

TRANSFER APPARATUS

BACKGROUND OF THE INVENTION

Field of the Invention

The present invention relates to a transfer apparatus.

Description of the Related Art

A processing system like ones disclosed in Japanese Patent Laid-open No. 2015-082569 and Japanese Patent Laid-open No. 2018-060958 includes a transfer apparatus that transfers a workpiece to a plurality of processing units.

SUMMARY OF THE INVENTION

The transfer apparatus moves to positions corresponding to the respective processing units in a state of being connected to a suction source, an air source, a water source, and a power source as disclosed in Japanese Patent Laid-open No. 2020-194901 and Japanese Patent Laid-open No. 2015-217501. Therefore, an accommodating member such as CABLEVEYOR (registered trademark) accommodating pipes and wires is coupled at one end thereof to the transfer apparatus, and the transfer apparatus moves while dragging the accommodating member. Hence, during the movement, the accommodating member and the wires and pipes rub against each other, which generates dust that may contaminate a clean room in which the processing system is installed.

Accordingly, it is an object of the present invention to provide a transfer apparatus capable of suppressing generation of dust in transferring a workpiece to a plurality of processing units.

In accordance with an aspect of the present invention, there is provided a transfer apparatus that transfers a workpiece to a plurality of processing units, including a track provided along a moving route extending according to arrangement of the plurality of processing units, a transfer unit having a holding portion that holds under suction and releases the workpiece, and a moving mechanism that moves the transfer unit in such a manner as to be guided by the track. The transfer unit includes a suction mechanism that causes a suction force to act on the holding portion, a release mechanism that causes the workpiece held under suction by the holding portion to be released from the holding portion, a holding portion moving mechanism that moves the holding portion horizontally and vertically with use of electric power, and a storage battery for supplying the electric power to the holding portion moving mechanism.

Preferably, the transfer unit further includes a water supply mechanism that supplies the workpiece held by the holding portion with water.

Preferably, the water supply mechanism is of a circulating type and includes a water reservoir to be used to cause the workpiece held by the holding portion to be immersed into water, an ultraviolet irradiation unit that irradiates water recovered from the water reservoir with ultraviolet rays, an ion exchange unit that subjects water discharged from the ultraviolet irradiation unit to ion exchange, and a filter that filters water discharged from the ion exchange unit, and the water thus filtered is supplied back to the water reservoir.

In the transfer apparatus, the transfer unit includes the suction mechanism that applies the suction force to the holding portion holding the workpiece, the release mechanism for causing the workpiece to be released from the holding portion, the holding portion moving mechanism for moving the holding portion, and the storage battery for supplying the holding portion moving mechanism with the electric power. This eliminates the need to externally supply the transfer unit with electric power, fluid, and the like, and hence, the transfer unit does not need to include wires and pipes that are routed externally from the transfer unit and an accommodating member for accommodating the wires and pipes. Accordingly, generation of dust due to rubbing between the accommodating member and the wires and pipes can be suppressed.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 5 is a front view illustrating the configuration of the transfer unit in a further state; and FIGS. 6A to 6C are schematic views illustrating a configuration of a suction/release mechanism included in the transfer unit according to a modification to the embodiment.

DETAILED DESCRIPTION OF THE PREFERRED EMBODIMENT

Figure 1:
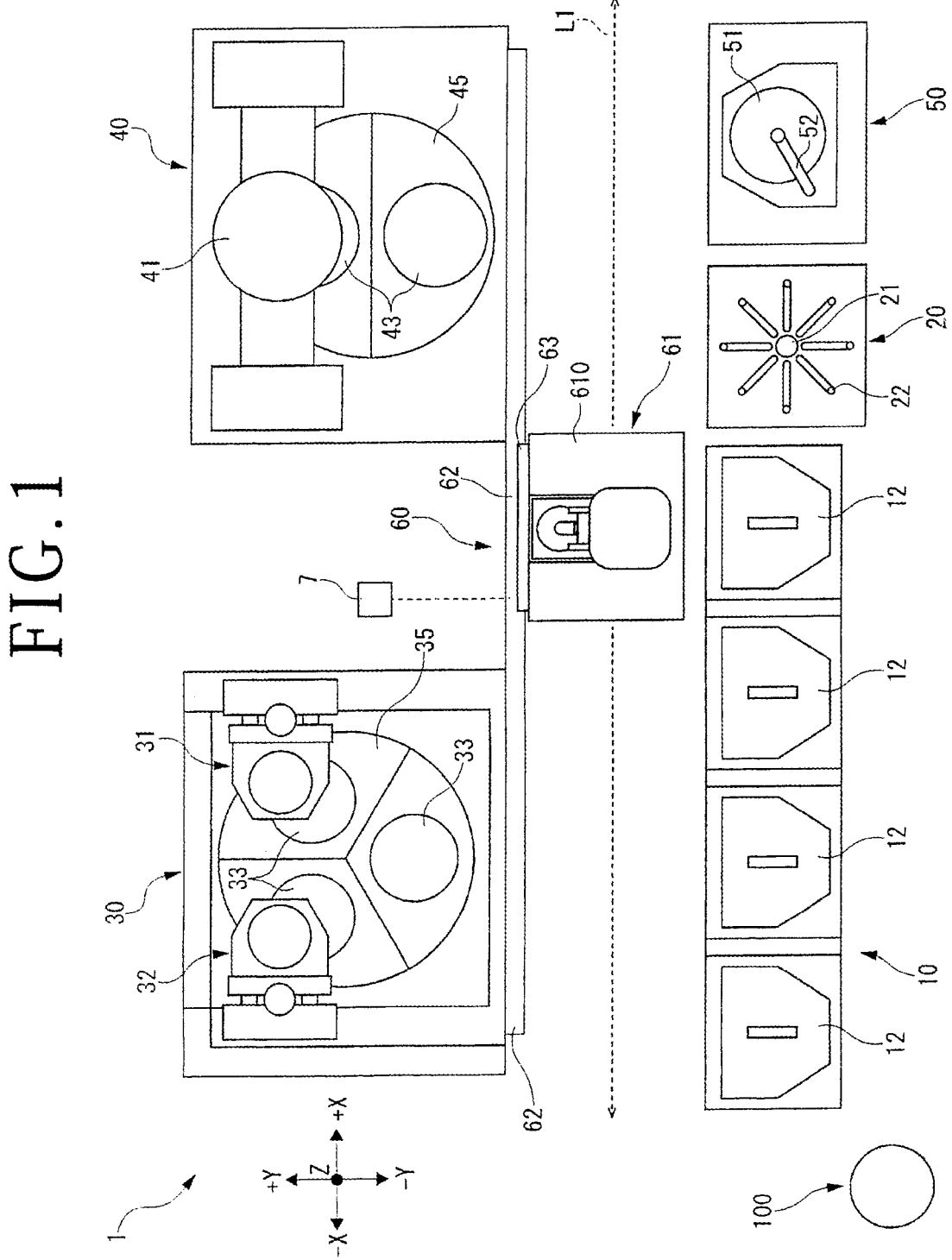
FIG. 1 is a plan view illustrating a configuration of a processing system including a transfer apparatus according to an embodiment of the present invention.

As illustrated in FIG. 1, a processing system 1 according to an embodiment of the present invention processes wafers 100 accommodated in cassettes 12 of a cassette mechanism 10 with use of a plurality of processing units, namely, a positioning unit 20, a grinding device 30, a polishing device 40, and a spinner cleaning unit 50, and is installed in a clean room not illustrated, for example.

In the processing system 1, a wafer 100 is transferred by a transfer apparatus 60 from one to another of the plurality of processing units. The transfer apparatus 60 transfers the wafer 100, which is an example of a workpiece, to the plurality of processing units and is movable along a moving route L1 extending in an X-axis direction according to the arrangement of the plurality of processing units.

Figure 2A:
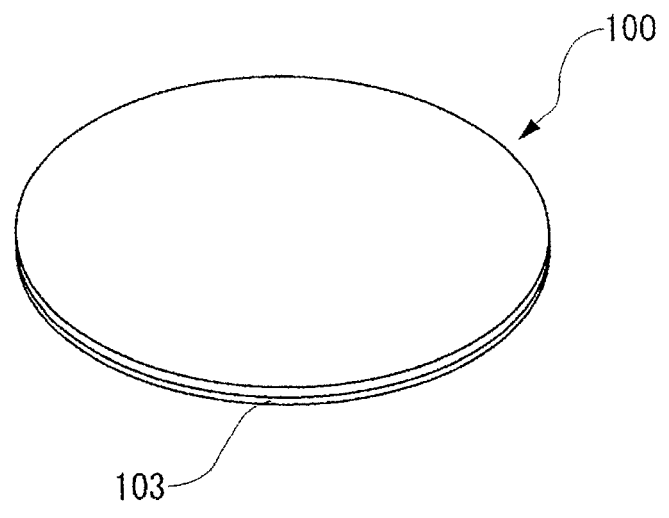
FIG. 2A is a perspective view of a wafer to be processed in the processing system.

The cassette mechanism 10 includes a plurality of cassettes 12, and each cassette 12 accommodates a plurality of wafers 100. Each wafer 100 is an example of the workpiece and is, for example, a circular semiconductor wafer. In the present embodiment, for example, the wafer 100 provided with a protective sheet 103 for protecting the wafer 100 as illustrated in FIG. 2A is accommodated in the cassette 12.

Figure 2B:
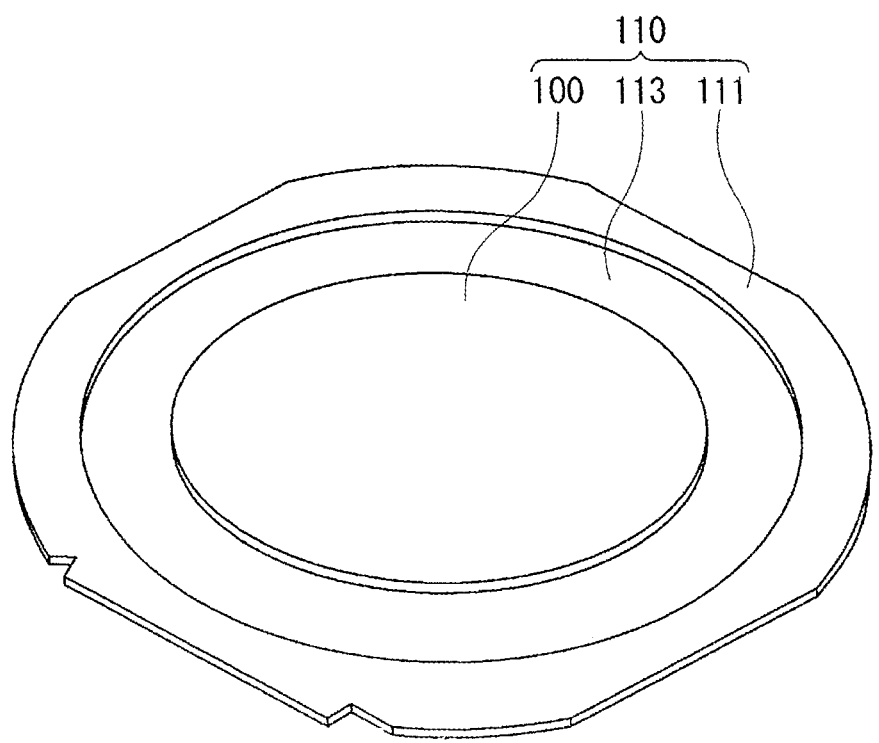
FIG. 2B is a perspective view of a frame unit including the wafer.

Alternatively, the wafer 100 may be handled in the form of a frame unit 110 as illustrated in FIG. 2B. The frame unit 110 includes an annular frame 111 having an opening capable of receiving the wafer 100, the wafer 100 positioned in the opening of the annular frame 111, and a tape 113 as a dicing tape through which the annular frame 111 and the wafer 100 are integrated with each other.

When being subjected to processing by the processing system 1 illustrated in FIG. 1, the wafer 100 thus prepared is taken out from the cassette 12 and placed on a positioning table 21 of the positioning unit by the transfer apparatus 60.

The positioning unit 20 includes the positioning table 21 and a plurality of positioning pins 22 arranged in such a manner as to surround the positioning table 21. In the positioning unit 20, the plurality of positioning pins 22 are moved in a radial direction toward the center of the positioning table 21, thereby reducing the diameter of a circle connecting the positioning pins 22. This aligns the wafer 100 placed on the positioning table 21 with a predetermined position (with the center). The wafer 100 thus aligned is transferred to the grinding device 30 by the transfer apparatus 60.

The grinding device 30 includes a rough grinding unit 31 that carries out rough grinding on the wafer 100 and a finish grinding unit 32 that carries out finish grinding on the wafer 100. The grinding device 30 further includes three chuck tables 33 each for holding the wafer 100 thereon and a turntable 35 supporting the three chuck tables 33.

In the grinding device 30, the turntable 35 is rotated about its central axis, and accordingly, the three chuck tables 33 supported on the turntable 35 are sequentially moved between a loading/unloading position, a rough-grinding position, and a finish-grinding position. In the grinding device 30, the turntable 35 is thus rotated to move one of the chuck tables 33 to the loading/unloading position located on a −Y direction side, where the transfer apparatus 60 can load and unload the wafer 100 onto and from the chuck table 33. The chuck table 33 holding the wafer 100 thereon is then sequentially moved to the rough-grinding position below the rough grinding unit 31 and the finish-grinding position below the finish grinding unit 32 such that the rough grinding unit 31 and the finish grinding unit 32 can carry out the respective grinding operations on the wafer 100. The wafer 100 thus ground is transferred to the polishing device 40 by the transfer apparatus 60.

The polishing device 40 includes a polishing unit 41 that polishes the wafer 100. The polishing device 40 further includes two chuck tables 43 each for holding the wafer 100 thereon and a turntable 45 supporting the two chuck tables 43. The polishing unit 41 includes, for example, a polishing pad containing fixed abrasive grains.

In the polishing device 40, the turntable 45 is rotated about its central axis, and accordingly, the two chuck tables 43 supported on the turntable 45 are sequentially moved between a loading/unloading position and a polishing position. In the polishing device 40, the turntable 45 is thus rotated to move one of the chuck tables 43 to the loading/unloading position located on the −Y direction side, where the transfer apparatus 60 can load and unload the wafer 100 onto and from the chuck table 43. The chuck table 43 holding the wafer 100 thereon is then moved to the polishing position below the polishing unit 41 such that the polishing unit 41 can carry out polishing on the wafer 100. The wafer 100 thus polished is placed on a spinner table 51 of the spinner cleaning unit 50 by the transfer apparatus 60.

The spinner cleaning unit 50 is for cleaning the wafer 100 and includes the spinner table 51 for holding the wafer 100 thereon and a nozzle 52 for jetting cleaning water and dry air toward the spinner table 51.

In the spinner cleaning unit 50, while the spinner table 51 holding the wafer 100 thereon is being rotated about its central axis, cleaning water is jetted from the nozzle 52 toward the wafer 100, thereby carrying out spinner cleaning on the wafer 100. The wafer 100 is then blown with dry air from the nozzle 52 to be dried.

The wafer 100 thus cleaned by the spinner cleaning unit 50 is loaded into a predetermined one of the cassettes 12 of the cassette mechanism 10 by the transfer apparatus 60.

In addition, as illustrated in FIG. 1, the processing system 1 includes a controller 7 for controlling the respective components of the processing system 1 described above. The controller 7 carries out processing on the wafer 100 by controlling the plurality of processing units, namely, the positioning unit 20, the grinding device 30, the polishing device 40, and the spinner cleaning unit 50, while transferring the wafer 100 with use of the transfer apparatus 60.

Figure 3:
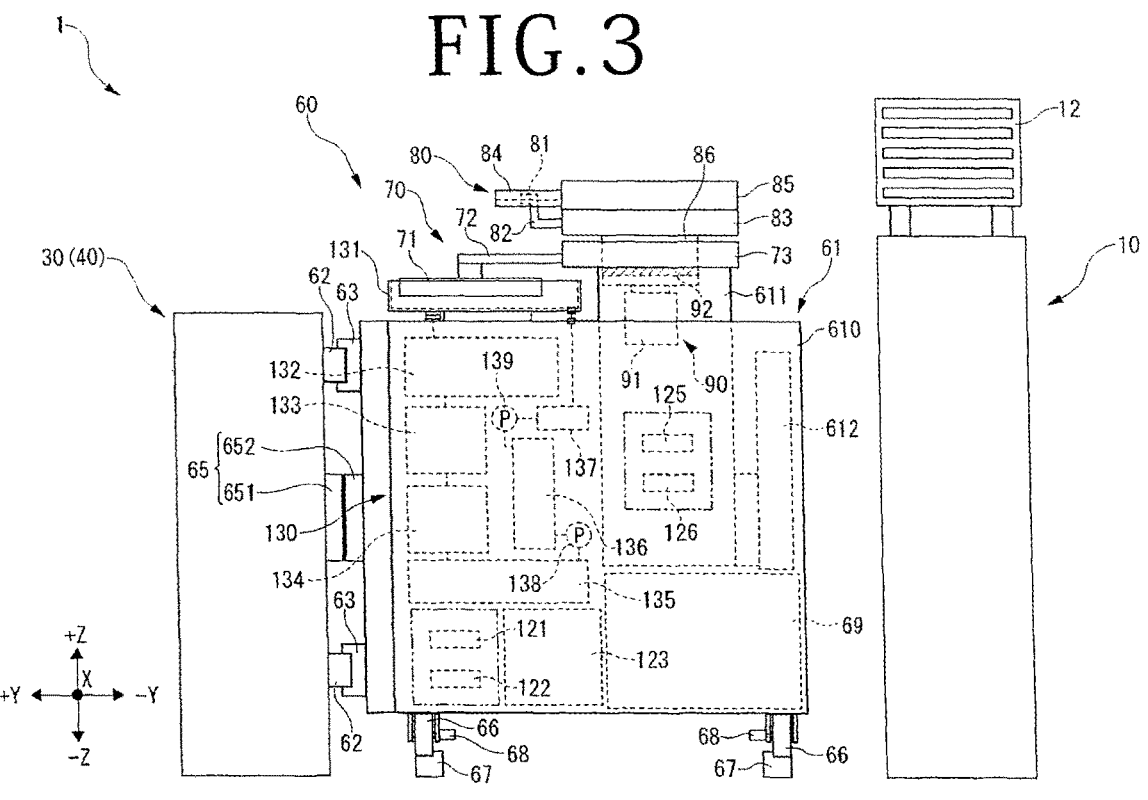
FIG. 3 is a front view illustrating a configuration of a transfer unit, in one state, included in the transfer apparatus.

Described next is a configuration of the transfer apparatus 60. As illustrated in FIG. 1, the transfer apparatus 60 includes a transfer unit 61 having a housing 610, and guide rails 62. The guide rails 62 represent an example of a track provided along the moving route L1 of the transfer apparatus 60. In the present embodiment, as illustrated in FIG. 3, a pair of upper and lower guide rails 62 are attached to side surfaces on the −Y direction side of the grinding device 30 and the polishing device 40 in such a manner as to extend along the moving route L1.

The transfer apparatus 60 further includes sliding members 63 disposed on a side surface on a +Y direction side of the housing 610 of the transfer unit 61, the sliding members 63 being fitted with the guide rails 62 to be slidably movable along the guide rails 62. The transfer unit 61 is supported by the guide rails 62 through the sliding members 63, so that it is movable along the guide rails 62. It is to be noted that the transfer apparatus 60 may include, in place of the sliding members 63, wheels that are engaged with the guide rails 62 to be able to roll on the guide rails 62.

The transfer apparatus 60 further includes a linear motor 65 disposed between the housing 610 of the transfer unit 61 on one hand and the grinding device 30 and the polishing device 40 on the other hand. The linear motor 65 includes a fixed rail 651 disposed along the guide rails 62 on the side surfaces on the −Y direction side of the grinding device 30 and the polishing device 40, and a mover 652 disposed on the side surface on the +Y direction side of the housing 610 of the transfer unit 61 in such a manner as to face the fixed rail 651. The linear motor 65 gives a driving force in a direction along the guide rails 62, to the transfer unit 61 provided with the mover 652. It is to be noted that the linear motor 65 is controlled by a motor controller 69 provided in the transfer unit 61.

In the transfer apparatus 60, the sliding members 63 and the linear motor 65 enable the movement of the transfer unit 61 along the guide rails 62. It is to be noted that the sliding members 63, the linear motor 65, and the motor controller 69 constitute an example of a moving mechanism that causes the transfer unit 61 to move while being guided by the guide rails 62.

It is to be noted that a pair of floor rails 67 extending along the moving route L1 (refer to FIG. 1) of the transfer apparatus 60 are installed on a floor surface under the housing 610 of the transfer unit 61. The housing 610 of the transfer unit 61 has, on its lower surface, a plurality of (four, for example) wheels 66 capable of rolling on the floor rails 67.

In the transfer apparatus 60, in this manner, the transfer unit 61 is supported from below by the wheels 66 capable of rolling on the floor rails 67 extending along the moving route L1. Therefore, when the transfer unit 61 is moved by the linear motor 65 along the guide rails 62, it is possible to firmly support the transfer unit 61 from below.

It is to be noted that the transfer apparatus 60 may include motors 68 for rotationally driving the wheels 66. The motors 68 are controlled by the motor controller 69, for example. In this case, when the transfer unit 61 is moved by the linear motor 65, the wheels 66 are rotationally driven by the motors 68, thereby facilitating the movement of the transfer unit 61.

In this case, the floor rails 67 represent another example of the track provided along the moving route L1 of the transfer apparatus 60, and the wheels 66, the motors 68, and the motor controller 69 constitute another example of the moving mechanism that causes the transfer unit 61 to move while being guided by the floor rails 67. Further, in the case where it is possible to move the transfer unit 61 by the motors 68 along the floor rails 67, the transfer unit 61 may not necessarily include the sliding members 63 and the linear motor 65.

In addition, the transfer unit 61 includes a column 611 extending upward from a position inside the housing 610 as illustrated in FIG. 3. The transfer unit 61 further includes a wafer holding portion 70 disposed at an upper portion of the column 611, the wafer holding portion 70 having a transfer pad 71 as a holding portion that holds and releases the wafer 100 as a workpiece. The transfer unit 61 further includes a battery 123 inside the housing 610.

The wafer holding portion 70 is used to handle the wafer 100 illustrated in FIG. 2A. As illustrated in FIG. 3, the wafer holding portion 70 includes the transfer pad 71 for holding the wafer 100, a transfer arm 72 having the transfer pad 71 at a tip end thereof, and a transfer pad moving mechanism 73 for supporting and moving the transfer pad 71.

The transfer pad moving mechanism 73 is disposed at the upper portion of the column 611 and supports the transfer arm 72. The transfer pad moving mechanism 73 is capable of extending and retracting the transfer arm 72 with use of electric power supplied from the battery 123.

Moreover, the transfer unit 61 includes, inside the housing 610, an elevating mechanism 612 that vertically moves the column 611 supporting the transfer pad moving mechanism 73, with use of the electric power supplied from the battery 123.

Figure 4:
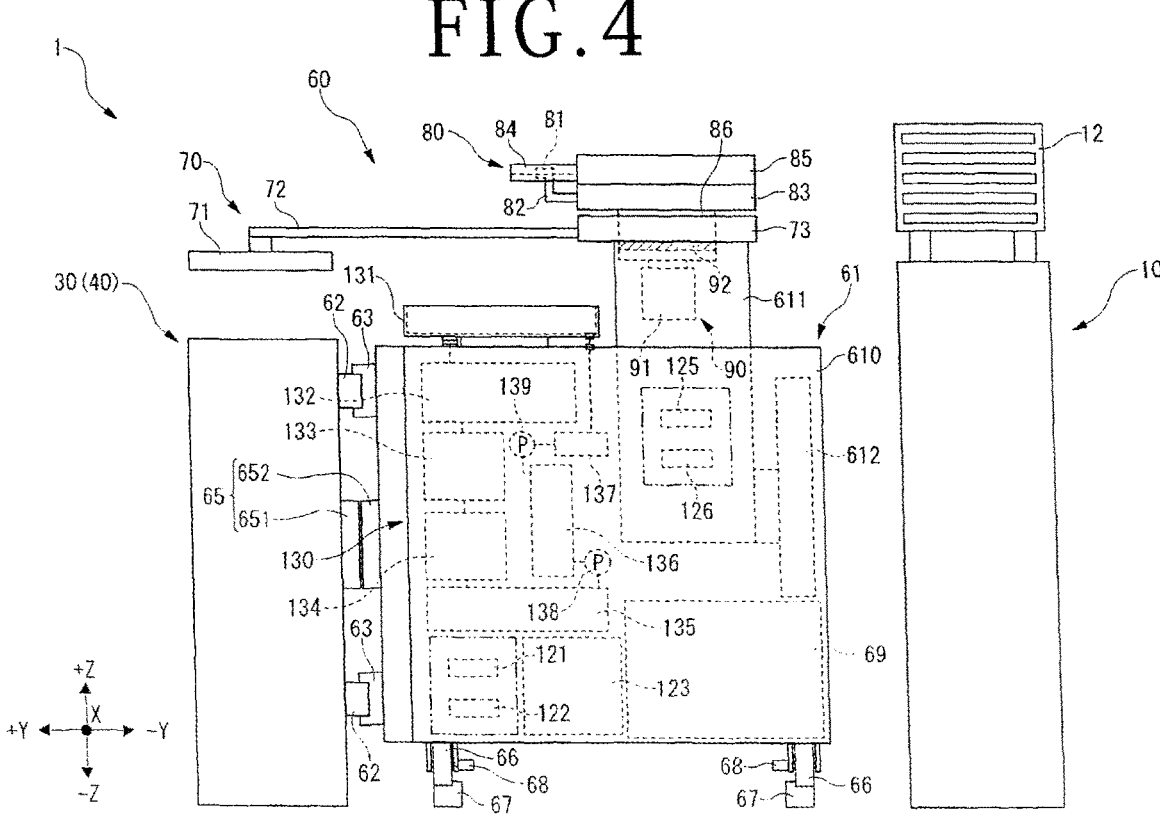
FIG. 4 is a front view illustrating the configuration of the transfer unit in another state.

Accordingly, in the transfer unit 61, it is possible to move the transfer pad 71 provided at the tip end of the transfer arm 72 to a desired position as illustrated in FIG. 4 by the elevating mechanism 612 moving the transfer pad moving mechanism 73 up and down together with the column 611 and by the transfer pad moving mechanism 73 extending and retracting the transfer arm 72, the elevating mechanism 612 and the transfer pad moving mechanism 73 being driven by the electric power supplied from the battery 123.

In this manner, the transfer arm 72, the transfer pad moving mechanism 73, the column 611, and the elevating mechanism 612 function as a holding portion moving mechanism that horizontally and vertically moves the transfer pad 71 with use of the electric power. The battery 123 functions as a storage battery for supplying the electric power to the holding portion moving mechanism.

The transfer unit 61 further includes a suction mechanism 121 and a release mechanism 122 provided inside the housing 610. The suction mechanism 121 is a suction source and causes a suction force to act on the transfer pad 71 of the wafer holding portion 70. That is, the transfer pad 71 is capable of holding the wafer 100 under suction when it is communicated with the suction mechanism 121 and receives the suction force therefrom.

The release mechanism 122 is an air source and causes the wafer 100 held under suction by the transfer pad 71 to be released from the transfer pad 71. That is, the transfer pad 71 is capable of jetting air toward the wafer 100 to release the held wafer 100 when it is communicated with the release mechanism 122.

In the transfer apparatus 60 configured as described above, the position of the transfer pad 71 is adjusted with use of the transfer arm 72, the transfer pad moving mechanism 73, the column 611, and the elevating mechanism 612 while the transfer pad 71 is communicated with the suction mechanism 121 or the release mechanism 122, so that the wafer 100 can be loaded to and unloaded from a predetermined one of the cassettes 12 of the cassette mechanism 10, the positioning unit 20, the grinding device 30, the polishing device 40, and the spinner cleaning unit 50.

It is to be noted that the transfer unit 61 may use a suction mechanism 125 and a release mechanism 126 in place of the suction mechanism 121 and the release mechanism 122. The suction mechanism 125 and the release mechanism 126 have functions same as those of the suction mechanism 121 and the release mechanism 122 but are disposed in the column 611.

The transfer unit 61 further includes a frame unit holding portion 80 having a gripping portion 81 as a holding portion different from the transfer pad 71. The frame unit holding portion 80 is used to handle the frame unit 110 including the wafer 100 illustrated in FIG. 2B.

As illustrated in FIG. 3, the frame unit holding portion 80 includes the gripping portion 81 that grips the annular frame 111 of the frame unit 110, a gripping portion arm 82 having the gripping portion 81 at a tip end thereof, and a gripping portion moving mechanism 83 for supporting and moving the gripping portion arm 82. The frame unit holding portion 80 further includes a frame guide 84 for guiding the annular frame 111 of the frame unit 110 and a frame guide moving mechanism 85 for supporting and moving the frame guide 84.

The gripping portion 81 is, for example, a mechanical clamp and is capable of gripping an outer peripheral edge of the annular frame 111. The gripping portion moving mechanism 83 is disposed above the transfer pad moving mechanism 73 of the wafer holding portion 70 and supports the gripping portion arm 82. The gripping portion moving mechanism 83 is capable of extending and retracting the gripping portion arm 82 with use of the electric power supplied from the battery 123.

Further, the gripping portion moving mechanism 83 is supported by the column 611 through a support column 86 extending in such a manner as to penetrate the transfer pad moving mechanism 73 and through a rotation mechanism 90. The rotation mechanism 90 is capable of horizontally rotating the gripping portion moving mechanism 83 together with the gripping portion arm 82 and the gripping portion 81 by causing a motor 91 to rotate the support column 86.

In addition, as described above, the transfer unit 61 includes, inside the housing 610, the elevating mechanism 612 that vertically moves the column 611 supporting the gripping portion moving mechanism 83, with use of the electric power supplied from the battery 123.

The frame guide 84 is used for holding a circumference of the annular frame 111 of the frame unit 110 gripped by the gripping portion 81. The frame guide moving mechanism 85 is overlaid on an upper portion of the gripping portion moving mechanism 83 in such a manner that it is raised, lowered, and rotated together with the gripping portion moving mechanism 83 and is capable of extending and retracting the frame guide 84 with use of the electric power supplied from the battery 123.

Accordingly, in the transfer unit 61, with use of the electric power supplied from the battery 123, the elevating mechanism 612 raises and lowers the gripping portion moving mechanism 83 and the frame guide moving mechanism 85 of the frame unit holding portion 80 together with the column 611, the rotation mechanism 90 rotates the gripping portion moving mechanism 83 and the frame guide moving mechanism 85, the gripping portion moving mechanism 83 extends and retracts the gripping portion arm 82, and the frame guide moving mechanism 85 extends and retracts the frame guide 84. In this manner, it is possible to move the gripping portion 81 and the frame guide 84 to a desired position as illustrated in FIG. 5. In the example illustrated in FIG. 5, the frame unit holding portion 80 is loading or unloading the frame unit 110 into or from a predetermined one of the cassettes 12.

It is to be noted that the rotation mechanism 90 includes a clutch 92 for coupling the transfer pad moving mechanism 73 of the wafer holding portion 70 to the motor 91. In the rotation mechanism 90, the transfer pad moving mechanism 73 can be rotated horizontally together with the transfer arm 72 and the transfer pad 71 by the clutch 92 coupling the transfer pad moving mechanism 73 to the motor 91.

Moreover, the transfer unit 61 includes a water supply mechanism 130 that supplies water to the wafer 100 as a workpiece held by the transfer pad 71 of the wafer holding portion 70. The water supply mechanism 130 is a circulating device driven by the electric power supplied from the battery 123. The flow rate of the water circulated in the water supply mechanism 130 is approximately 1 to 1.5 L/min, for example.

The water supply mechanism 130 includes a water reservoir 131 provided on an upper surface of the housing 610 as well as a buffer tank 132, a pump 133, an ultraviolet (UV) irradiation unit 134, an ion exchange unit 135, a filter 136, and a resistivity meter 137 which are disposed inside the housing 610 as illustrated in FIG. 3.

The water reservoir 131 is configured as a water tank capable of storing water therein and receiving the transfer pad 71 holding the wafer 100. That is, the water reservoir 131 is used to cause the wafer 100 held by the transfer pad 71 to be immersed into the water and get wet. Causing the wafer 100 held by the transfer pad 71 to get wet in advance enables, for example, prevention of slurry that is left on the wafer 100 after chemical mechanical polishing (CMP) is carried out by the polishing device 40 from adhering to the wafer 100. The water supply mechanism 130 is configured such that the water stored in the water reservoir 131 is recovered, purified, and then returned to the water reservoir 131.

More specifically, in the water supply mechanism 130, the water stored in the water reservoir 131 is recovered into and stored in the buffer tank 132 every predetermined length of time, for example. The storage capacity of the buffer tank 132 is approximately 1.5 L, for example. The water stored in the buffer tank 132 is sucked by the pump 133 and introduced into the UV irradiation unit 134. The UV irradiation unit 134 irradiates the water recovered from the water reservoir 131 with UV rays to sterilize the water. The water sterilized by the UV irradiation unit 134 is discharged from the UV irradiation unit 134 and introduced into the ion exchange unit 135. The ion exchange unit 135 subjects the water discharged from the UV irradiation unit 134 to ion exchange. This ion exchange purifies the water sterilized by the UV irradiation unit 134, thereby obtaining pure water, for example.

The water thus purified may contain minute impurities, such as resin dust derived from ion exchange resin, mixed therein. Therefore, the purified water is introduced to the filter 136. The filter 136 is, for example, a micro filter and filters the water discharged from the ion exchange unit 135. This is how impurities are removed from the water.

It is to be noted that, on an upstream side and a downstream side of the filter 136, a first pressure sensor 138 and a second pressure sensor 139 both for detecting a pressure of water passing therethrough are disposed, respectively. When the water pressure detected by the first pressure sensor 138 and the second pressure sensor 139 exceeds a predetermined value, it can be determined that the filter 136 has deteriorated due to deposition of impurities.

The water from which impurities have been removed by the filter 136 is returned to the water reservoir 131 through the resistivity meter 137 for measuring specific resistance. That is, the water supply mechanism 130 supplies the water filtered by the filter 136 back to the water reservoir 131. It is to be noted that a specific resistance value of the water measured by the resistivity meter 137 is used, for example, to detect the degree of purity of the water.

As described above, in the present embodiment, the transfer unit 61 of the transfer apparatus 60 includes the battery 123 that is the power source of the respective components, the suction mechanism 121 that is the suction source of the transfer pad 71, the release mechanism 122 that is the air source of the transfer pad 71, and the water supply mechanism 130 that causes circulation of the water stored in the water reservoir 131, which are all provided inside the housing 610. This eliminates the need to externally supply the transfer unit 61 with electric power and fluid such as water and air, and hence, the transfer unit 61 does not include wires and pipes that are routed externally from the transfer unit 61 and an accommodating member for accommodating the wires and pipes. Consequently, no dust is generated due to rubbing between the accommodating member and the wires and pipes, it is possible to prevent dust from contaminating the clean room in which the processing system 1 including the transfer apparatus 60 is installed.

It is to be noted that, in the present embodiment, a suction/release mechanism 150 as illustrated in FIG. 6A may be provided in place of the suction mechanism 121 and the release mechanism 122 illustrated in FIG. 3, for causing a suction force to act on the transfer pad 71 of the wafer holding portion 70 of the transfer unit 61 and causing the wafer 100 held under suction by the transfer pad 71 to be released from the transfer pad 71. As illustrated in FIG. 6A, the suction/release mechanism 150 includes a vacuum pump 151 and a single acting cylinder 153.

The single acting cylinder 153 includes a cylinder 201 and a piston 202 accommodated in the cylinder 201.

The piston 202 is formed in a disk shape and is disposed in the cylinder 201 in such a manner as to divide a space inside the cylinder 201 into a first chamber 210 on an upstream side and a second chamber 220 on a downstream side. The piston 202 has one surface coupled to an inner wall 230 of the cylinder 201 on a side of a first inflow/outflow port 205 via a spring 203. That is, the piston 202 is biased by the spring 203 in a direction away from the inner wall 230 of the cylinder 201 on the side of the first inflow/outflow port 205 as illustrated in FIG. 6A.

The cylinder 201 is formed in a cylindrical shape and has, at opposite ends thereof, the first inflow/outflow port 205 and a second inflow/outflow port 206 each for allowing air to flow into and out of the cylinder 201. The first inflow/outflow port 205 is used to allow air to flow into and out of the first chamber 210 of the cylinder 201. The second inflow/outflow port 206 is used to allow air to flow into and out of the second chamber 220 of the cylinder 201.

The vacuum pump 151 is connected to the first inflow/outflow port 205 of the cylinder 201 of the single acting cylinder 153 through a first valve 155. In addition, the vacuum pump 151 is connected to the transfer pad 71 of the wafer holding portion 70 through the first valve 155 and a second valve 156.

It is to be noted that the first inflow/outflow port 205 of the cylinder 201 is further allowed to communicate with outside air through the first valve 155.

Moreover, the second inflow/outflow port 206 of the cylinder 201 of the single acting cylinder 153 is connected to the transfer pad 71 of the wafer holding portion 70 through a third valve 157 and a first filter 158. The second inflow/outflow port 206 is further allowed to communicate with outside air through the third valve 157 and a second filter 159.

In the suction/release mechanism 150 configured as described above, when a suction force is to be caused to act on the transfer pad 71 of the wafer holding portion in order to have the wafer 100 held under suction by the transfer pad 71, the controller 7 (refer to FIG. 1) of the processing system 1 controls the first valve 155 and the second valve 156 to cause the vacuum pump 151 to communicate with the transfer pad 71 of the wafer holding portion 70 as illustrated in FIG. 6A. This applies a suction force from the vacuum pump 151 to the transfer pad 71, so that the wafer 100 can be held under suction by the transfer pad 71 as indicated by an arrow 300.

The controller 7 further controls the first valve 155 to cause the first inflow/outflow port 205 of the cylinder 201 of the single acting cylinder 153 to communicate with outside air as illustrated in FIG. 6A. In this instance, the piston 202 is away from the inner wall 230 due to a biasing force of the spring 203, and the first chamber 210 of the cylinder 201 has been widened. Into the first chamber 210 in this state, outside air is introduced through the first valve 155.

After the wafer 100 is held under suction by the transfer pad 71, the controller 7 closes the second valve 156 as illustrated in FIG. 6B. This can keep the wafer 100 in the state of being held by the transfer pad 71.

In this case, the controller 7 controls the third valve 157 to cause the second inflow/outflow port 206 of the cylinder 201 of the single acting cylinder 153 to communicate with outside air. The controller 7 further controls the first valve 155 to cause the vacuum pump 151 to communicate with the first inflow/outflow port 205 of the cylinder 201 of the single acting cylinder 153.

Air in the first chamber 210 of the cylinder 201 is then sucked, and the piston 202 is moved toward the inner wall 230 of the first chamber 210 against the biasing force of the spring 203 as indicated by an arrow 301. This widens the second chamber 220 of the cylinder 201, and outside air is introduced into the second chamber 220 through the third valve 157 and the second filter 159 and stored in the second chamber 220.

When the wafer 100 held under suction by the transfer pad 71 is to be released from the transfer pad 71, as illustrated in FIG. 6C, the controller 7 controls the first valve 155 to block the communication between the first inflow/outflow port 205 of the cylinder 201 and the vacuum pump 151 and cause the first inflow/outflow port 205 to communicate with outside air. Further, the controller 7 controls the third valve 157 to cause the second inflow/outflow port 206 of the cylinder 201 to be connected to the transfer pad 71 of the wafer holding portion 70.

As a result, the piston 202 is moved away from the inner wall 230 due to the biasing force of the spring 203, the first chamber 210 of the cylinder 201 is widened, and outside air is introduced into the first chamber 210 through the first valve 155. In addition, the outside air stored in the second chamber 220 of the cylinder 201 is fed to the transfer pad 71 through the first filter 158. The fed air is jetted from the transfer pad 71 toward the wafer 100, so that the wafer 100 held by the transfer pad 71 can be released from the transfer pad 71 as indicated by an arrow 302.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A transfer apparatus that transfers a workpiece to a plurality of processing units, comprising:
   a track provided along a moving route extending according to arrangement of the plurality of processing units;
   a transfer unit having a holding portion that holds under suction and releases the workpiece, and a holding portion moving mechanism that moves the holding portion horizontally and vertically with use of electric power, the holding portion being disposed at an upper portion of a column;
   a water reservoir used to cause the workpiece held by the holding portion to be immersed into water within the water reservoir; and
   a moving mechanism that moves the transfer unit in such a manner as to be guided by the track,
   wherein the transfer unit includes a housing in which are disposed, in a fully enclosed manner, within the housing:
      a suction mechanism that causes a suction force to act on the holding portion,
      a release mechanism that causes the workpiece held under suction by the holding portion to be released from the holding portion, and
      a storage battery for supplying the electric power to the holding portion moving mechanism.

2. The transfer apparatus according to claim 1,
   wherein the transfer unit further includes a water supply mechanism which is a circulating device driven by the electric power provided by the storage battery,
   wherein the water stored in the water reservoir is recovered into and stored in a buffer tank which is disposed within the housing in a fully enclosed manner, and
   wherein a filter is disposed within the housing in a fully enclosed manner, such that the water from the buffer tank filtered by the filter is supplied back to the water reservoir.

3. The transfer apparatus according to claim 1,
   wherein the transfer unit includes a linear motor disposed upon an outer side wall of the housing of the transfer unit.

4. A transfer apparatus that transfers a workpiece to a plurality of processing units, comprising:
   a track provided along a moving route extending according to arrangement of the plurality of processing units;
   a transfer unit having a holding portion that holds under suction and releases the workpiece; and a moving mechanism that moves the transfer unit in such a manner as to be guided by the track, wherein the transfer unit includes a housing in which are disposed, in a fully enclosed manner, within the housing:

a suction/release mechanism that causes a suction force to act on the holding portion and which causes the workpiece held under suction by the holding portion to be released from the holding portion, such that the suction/release mechanism includes a vacuum pump and a cylinder with a piston inside the cylinder which is biased by a spring within the cylinder, a holding portion moving mechanism that moves the holding portion horizontally and vertically with use of electric power, and a storage battery for supplying the electric power to the holding portion moving mechanism.

5. A transfer apparatus that transfers a workpiece to a plurality of processing units, comprising:

a track provided along a moving route extending according to arrangement of the plurality of processing units;

a transfer unit having a holding portion that holds under suction and releases the workpiece, and a holding portion moving mechanism that moves the holding portion horizontally and vertically with use of electric power, the holding portion being disposed at an upper portion of a column; and a moving mechanism that moves the transfer unit in such a manner as to be guided by the track, wherein the transfer unit includes a housing in which are disposed, in a fully enclosed manner, within the housing:

a suction mechanism that causes a suction force to act on the holding portion, a release mechanism that causes the workpiece held under suction by the holding portion to be released from the holding portion, and a storage battery for supplying the electric power to the holding portion moving mechanism, wherein the transfer unit includes a linear motor disposed upon an outer vertically oriented side wall of the housing of the transfer unit.

* * * * *